July 24, 1956　　E. H. AUGUST ET AL　　2,756,399
MOUNTING FOR METERING CURRENT TRANSFORMERS
Filed July 19, 1954
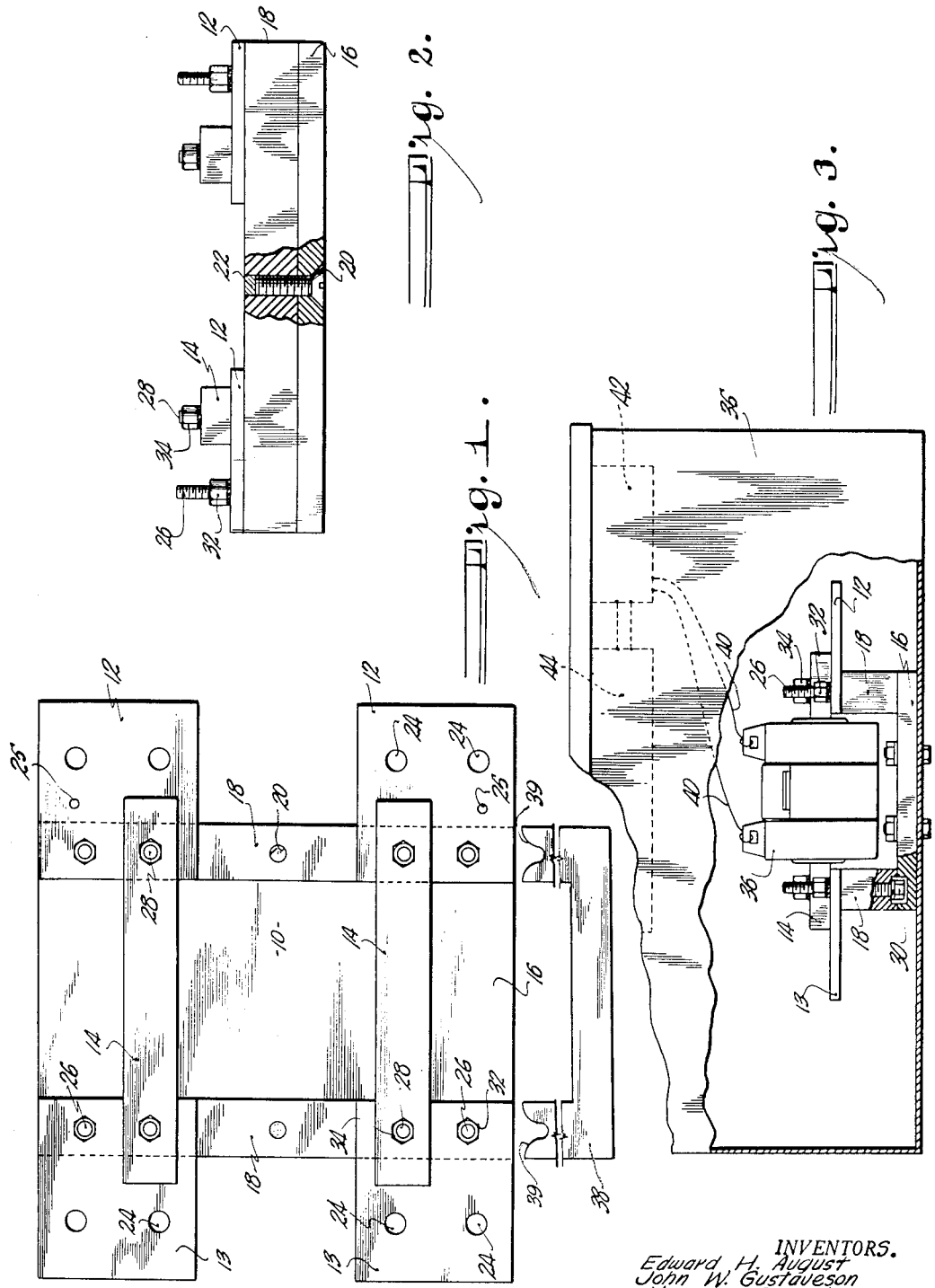
INVENTORS.
Edward H. August
John W. Gustaveson
Herman E. Hahn
BY
ATTORNEY.

United States Patent Office 2,756,399
Patented July 24, 1956

2,756,399

MOUNTING FOR METERING CURRENT TRANSFORMERS

Edward H. August, Independence, and John W. Gustaveson and Herman E. Hahn, Kansas City, Mo., assignors to Gustaveson, Inc., Kansas City, Mo., a corporation of Missouri Application July 19, 1954, Serial No. 444,152

2 Claims. (Cl. 336—174)

This invention relates to electrical power connections and particularly to mounting structure for metering current transformers.

In many instances where the load requirements are in the intermediate range, the power companies are now installing current transformers at the metering connection which have an open core secondary and a separate conductor bar extending through the secondary to provide a half ampere turn primary.

The most important object of the present invention is to provide structure releasably coupling the primary conductor bar in an electrical service line so that the entire transformer may be easily and quickly removed and replaced when in need of repair or inspection.

A further important object of the present invention is the provision of additional releasable means on the mounting structure by means of which a shorting bar may be substituted in the service line for the primary conductor, thus avoiding an interruption of service when the metering transformer is temporarily removed.

With these and other objects in view, the mounting structure of the present invention comprises generally a pair of spaced, non-conductive supports; a permanent bus bar on each support at each metering connection, the bus bars being coupled directly in an electrical service line; an elongated primary conductor spanning the distance between the bus bars; releasable fasteners on each bus bar for coupling the primary conductor in the service line; and additional releasable fasteners on the bus bars for coupling a shorting bar in the service line before removal of the primary conductor.

Other objectives include the provision of a base board of insulating material by means of which the mounting structure of the present invention is attached to a meter box or the like; suitable terminal connections on each bus bar for coupling the same permanently in a service line; and other, more minor objects which will become apparent in the specification which follows:

In the drawing:

Figure 1 is a top, plan view of mounting structure made in accordance with the present invention, showing a shorting bar adapted for use therewith.

Fig. 2 is a side, elevational view of the mounting structure of Fig. 1, parts being broken away and in section to reveal details of construction; and Fig. 3 is an end, elevational view of the mounting structure of Fig. 1, showing a current transformer mounted thereon, and illustrating one manner of mounting metering current transformers in conventional meter boxes.

The overall circuitry with which the mounting structure of the present invention is intended for use includes an outside, multiple wire, conductor which enters a meter box, wherein certain of the wires are coupled in what may be termed metering connections. From the meter box, the varying combinations of the multiple wires lead to the conventional fuse board and service circuits. Within the meter box, each wire coupled with a metering connection is included in the primary winding of a metering current transformer, the output of which is fed to an associated meter.

In practice, it becomes necessary for time-to-time, to remove such transformers for repairs, inspections and periodic maintenance. Such removal generally calls for an interruption in the delivery of power during the time interval required to remove and replace the particular transformer and to rewire the so-called metering connection. As mentioned above, the present invention relates to mounting structure by means of which the time required in making and breaking the metering connection is minimized, additionally, no interruption of service is involved.

Referring now to the drawing, wherein is illustrated a chosen embodiment, the mounting structure of the present invention includes generally, as elements thereof, a U-shaped support 10, a pair of permanent bus bars 12–13 at each metering connection and a removable, primary conductor 14 for each pair of permanent bus bars 12–13.

Support 10 has a rectangular base board 16 and a pair of upright legs 18 coextensive in length with the base board 16. Legs 18 are attached to base board 16 by means of screws 20 (Fig. 2), which are insulated by a suitable filler 22 of wax or the like. Base board 16 and legs 18 may be made of "Masonite" or any other suitable non-conductive material.

The bus bars 12–13 are provided with suitable terminal connections 24 to which the one or more conductors (not shown), of an individual service line may be permanently attached and with a pair of openings (not shown), through which the threaded ends of bolts 26 and 28 extend. Additionally, each bus bar 12 is provided with a metering potential connection 25 to which suitable leads (not shown), from an associated meter are attached. As shown in Fig. 3, the heads 30 of bolts 26—28 are embedded in the legs 18 of support 10. The primary conductor 14 of each metering connection is also provided with openings therein which receive the bolts 28. In this manner, bus bars 12–13 and primary conductor 14 are held in place with respect to support 10 by means of nuts 32 and 34 on bolts 26 and 28 respectively.

In use, the base board 16 is attached to one wall of a conventional meter box 35, substantially as illustrated in Fig. 3. Assuming a 3-phase, 3-wire electrical service line, requiring two metering current transformers, each including a primary conductor bar 14 and a donut-type, open core, secondary winding 36, the two metered wires of the three-wire service line are each coupled in one of the metering connections described above. Where the load requirements are sufficient to warrant the use of two three-wire conductors in the service line, the corresponding wire of each conductor is attached to one of the bus bars 13. For this reason, each bus bar 12–13 is provided with two terminals 24. The flow of current is, therefore, through the bus bar 13, primary conductor bar 14, the opposed bus bar 12 and thence to the associated service.

In this manner, the mounting structure of the present invention provides a continuous circuit for the current flowing in the metered wires. In the event that it becomes necessary to remove a secondary 36 for inspection or the like, it is highly desirable that the secondary 36 be removed and replaced quickly and also that there be no service interruption during such removal and replacement.

In order that service will not be interrupted, the lineman first loosens nuts 32 on bolts 26 and inserts a shorting bar 38 (Fig. 1), thereunder before tightening the nuts 32. The shorting bar 38 is U-shaped in configuration and has a bolt-receiving notch 39 at the extremity of each leg thereof.

The lineman may then remove the nuts 34 on bolts 28 and remove primary bar 14 from the bolts 28. Current will then pass from bus bar 13 through shorting bar 38, to the opposed bus bar 12. As soon as the lineman has inserted the primary bar 14 in a replacement secondary 36 and changed a pair of metering attachments 40, he may replace the primary conductor bar 14, and subsequently remove shorting bar 38. Meter attachments 40 lead from the terminals of secondary 36 to a shorting terminal block 42 and thence to a meter socket 44.

Manifestly, if a three-phase, four-wire system is employed, there will be three metered wires and, consequently, three pairs of stationary bus bars 12–13 on support 10. If desired, a continuous bus bar may be mounted on the legs 18 for coupling the third wire of a three-wire system or the fourth wire of a four-wire system. Otherwise, this wire is connected directly at the fuse board.

Thus, the mounting structure disclosed herein facilitates rapid removal and replacement of metering current transformers without any interruption of service. The provision of bus bars 12–13 for each metering connection avoids any rewiring of the primary each time the current transformer is replaced. Bolts 26–28 not only provide means for attaching bus bars 12–13 to the legs 18 of support 10, but also permit alternate insertion of primary conductor 14 and shorting bar 38 in the particular connection.

It is obvious that the embodiment herein disclosed is a preferred form only and that many changes or modifications may be made therein without departing from the broad principles of the present invention. Such changes or modifications are contemplated hereby and it is, therefore, desired to be limited only by the scope of the appended claims.

Having thus described the invention, what is claimed as new and desired to be secured by Letters Patent is:

1. In transformer apparatus for use in metering the flow of current through an electrical service line, which apparatus includes a donut type secondary winding unit having an electrically conductive winding and winding-supporting structure electrically insulated from said winding and provided with a central opening therethrough, the improvement of which comprises means for releasably supporting the unit and simultaneously providing a half-ampere turn, primary conductor therefor, said means comprising an electrically non-conductive support including a base board and a pair of legs mounted on the base board and extending laterally therefrom; an electrically conductive plate mounted on each leg respectively in spaced relationship to the base board and each other; means adapting the plates for connection in said line; an elongated, rigid, electrically conductive, primary conductor member of dimensions sufficient to extend between and overlap each of said plates, said member being adapted to removably pass through said opening of the unit and extend beyond both extremities of the latter; and a releasable fastener on each plate respectively, each fastener releasably attaching an end portion of the member to the corresponding plate in electrically contacting, overlapped engagement therewith.

2. In transformer apparatus for use in metering the flow of current through an electrical service line, which apparatus includes a donut type secondary winding unit having an electrically conductive winding and winding-supporting structure electrically insulated from said winding and provided with a central opening therethrough, the improvement of which comprises means for releasably supporting the unit and simultaneously providing a half-ampere turn, primary conductor therefor, said means comprising an electrically non-conductive support including a base board and a pair of legs mounted on the base board and extending laterally therefrom; an electrically conductive plate mounted on each leg respectively in spaced relationship to the base board and each other; means adapting the plates for connection in said line; an elongated, rigid, electrically conductive, primary conductor member of dimensions sufficient to extend between and overlap each of said plates, said member being adapted to removably pass through said opening of the unit and extend beyond both extremities of the latter; a releasable fastener on each plate respectively, each fastener releasably attaching an end portion of the member to the corresponding plate in electrically contacting, overlapped engagement therewith; an elongated, electrically conductive shorting bar of dimensions sufficient to extend from one plate to the other while in overlapped relation to each; and a second releasable fastener on each plate respectively, each of said second fasteners being adapted for releasably attaching an end portion of the bar to the corresponding plate in electrically contacting, overlapped engagement therewith.

References Cited in the file of this patent

UNITED STATES PATENTS

| 1,022,880 | Schmidt | Apr. 9, 1912 |
| 1,766,048 | Trogner | June 24, 1930 |
| 2,436,636 | D'Entremont | Feb. 24, 1948 |